Feb. 19, 1929.

A. W. CAPS 1,702,995

DUPLEX CAMERA

Filed March 24, 1927     4 Sheets-Sheet 1

INVENTOR
Arthur W. Caps.
BY
his ATTORNEYS

Feb. 19, 1929.  
A. W. CAPS  
1,702,995  
DUPLEX CAMERA  
Filed March 24, 1927  
4 Sheets-Sheet 2

INVENTOR  
Arthur W. Caps.  
BY  
his ATTORNEYS

Feb. 19, 1929.  
A. W. CAPS  
1,702,995  
DUPLEX CAMERA  
Filed March 24, 1927  4 Sheets-Sheet 3

INVENTOR  
Arthur W. Caps.  
BY  
his ATTORNEYS

Feb. 19, 1929.

A. W. CAPS 1,702,995

DUPLEX CAMERA

Filed March 24, 1927 4 Sheets-Sheet 4

INVENTOR
*Arthur W. Caps.*
BY
*his* ATTORNEYS

Patented Feb. 19, 1929.

1,702,995

UNITED STATES PATENT OFFICE.

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND.

DUPLEX CAMERA.

Application filed March 24, 1927. Serial No. 177,875.

This invention relates to photographic cameras and more particularly to a camera for exposing both sides of a photographic sheet.

An object of this invention is to provide a holder for the photographic sheet material which may be revolved in the focal plane of the projecting means to expose both sides of the sheet independently of the spool which supplies the sheet. Another object is to provide automatic means for feeding the sheet material to the holder when the holder is revolved. Another object is to provide improved sheet severing means. Another object is to provide improved means for regulating the feeding mechanism to vary the length of sheet delivered from the machine. Another object is to provide an improved apparatus which may be mounted on a panel and set into the wall of a dark room to form an integral part of the same. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown one of the various possible embodiments of this invention, Figure 1 is a perspective view of the machine with certain parts broken away for purposes of illustration;

Similar reference characters refer to similar parts throughout the several views of the drawings.

Figure 1:
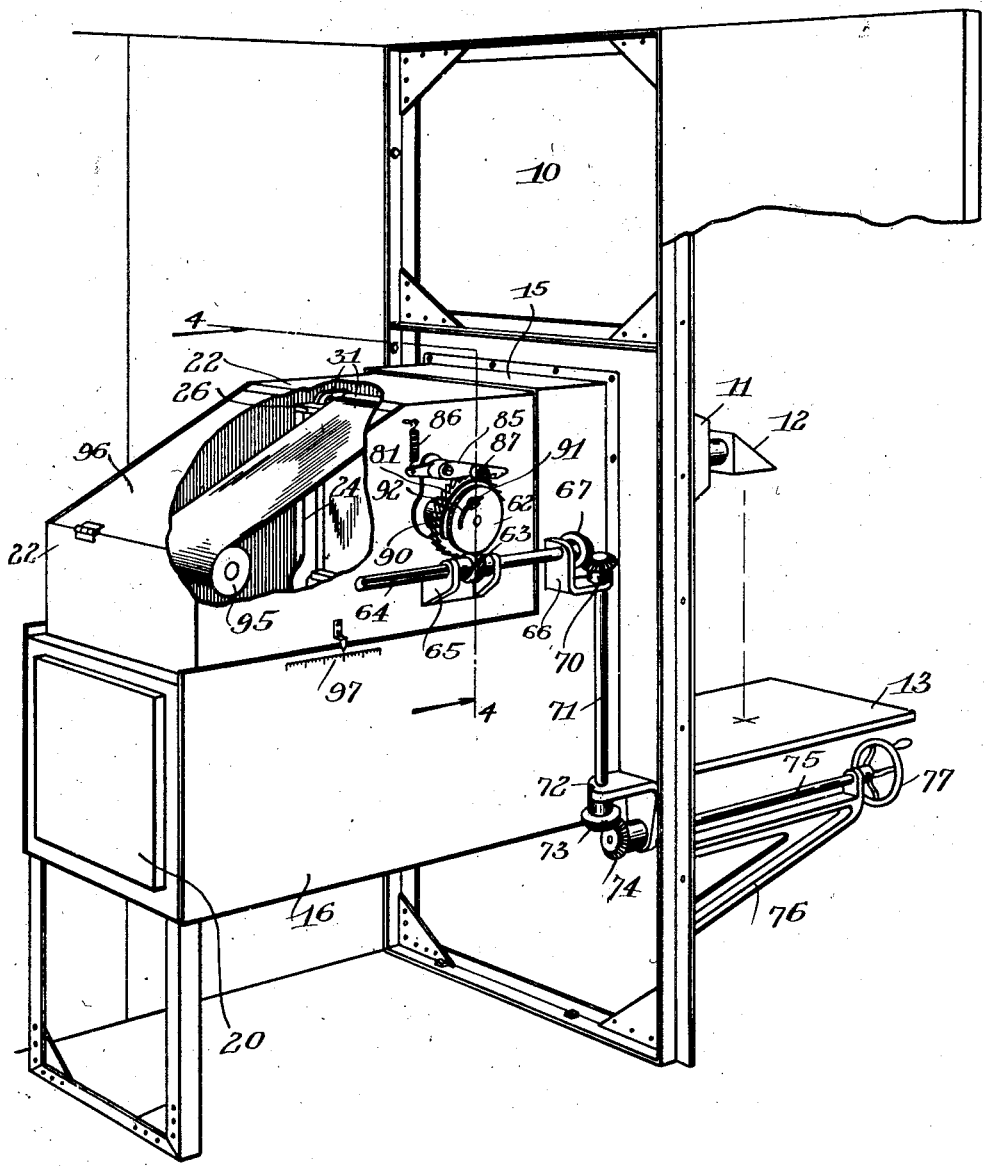

Referring now to the drawings in detail, there is shown a panel 10 which may be of sheet metal and which serves as a rigid support for the apparatus. The panel 10 is preferably of such a construction that it may readily form a portion of a dark room wall. The sides and ends of the panel may be suitably reenforced with T-beams or angle irons to aid in supporting the camera and to provide means for joining other wall sections thereto. The panel is provided with a substantially centrally disposed aperture of suitable outline. A cowl or hood 11 carrying the lens and prism 12 is attached to the front face of the panel with its base edge forming a light tight connection therewith around the periphery of the aperture. A subject holder 13 is mounted for vertical adjustment on the rods 14 supported on the front face of the panel.

A sleeve member 15 is mounted on the rear face of the panel in substantial coincidence with the side and upper edges of the aperture and the base of the cowl 11. The lower portion of the sleeve 15 is extended rearwardly to form the bottom and side walls of a box or print receiving chamber 16. The top wall of the chamber 16 is attached to the side walls a short distance below the top of the said side walls in order to form a channel therebetween, and the end of the top wall adjacent the panel is cut away to provide an aperture therein. Immediately below the top wall aperture an inclined plate or partition 17 is positioned within the chamber 16 in such a manner that prints falling thereon are guided toward a door 20 in the chamber. The chamber 16 is supported adjacent one end by the panel 10 and adjacent the other end by any suitable means such as an angle iron frame.

The chamber 16 forms a support for a magazine 22 which is slidably mounted in the channel formed by the top and side walls of the chamber 16 and telescopes with the upper portion of the sleeve 15, forming light tight connections and thereby completing an exposure chamber for sensitized sheet material. The magazine has an aperture in its bottom wall which normally registers with the aperture in the top wall of the chamber 16. A paper or sheet holder 23 is pivotally mounted within the magazine directly over the aperture in the bottom wall thereof.

The sheet holder comprises a rectangular frame having side members 24 and 25 rigidly connected together by end members 26 and 27. The end members are each provided with a centrally disposed longitudinally extending slot through which sheet material may be passed. End member 26 is provided with bearings 30 for supporting guide rollers 31 above and substantially parallel to the slot in said end member. The rollers 31 may be of rubber or other suitable material and they may be so positioned as to be normally in contact with each other or spaced apart a distance substantially equal to the thickness of the sensitized sheet material to be passed therebetween and guided thereby. The end member 27 which normally forms the lower portion of the holder is also provided with a pair of rollers 32 and 33 spaced above and extending substantially parallel to the slot in the said end member, which serve as feed rollers during the operation of the apparatus.

The central portions of the lower end portions of the side members 24 and 25 are cut away and the end member 27 forms therewith apertures or slots through which the end portions of the rollers 32 and 33 project. The roller 32 is journaled in the rigid supports 34 mounted on the member 27 adjacent the opposite ends thereof and has a sprocket wheel 38 rigidly mounted on an end portion thereof for a purpose to be presently described. The roller 33 is journaled in corresponding arms of bell crank levers 35 which are pivotally mounted on the supports 34 and which have their other arms attached to springs 36 which are anchored to the side members 24 and 25. The tension of the springs 36 is sufficient to normally hold the rollers 32 and 33 yieldingly in contact.

To further aid in guiding the sheet material through the holder and for the purpose of confining the exposure to the desired portion of the sheet, a mask 37 is removably mounted within the frame. The mask 37 lies in contact with a downwardly projecting rib 40 adjacent the slot in the member 26 and is supported by stirrup members 41 which are attached to the side members 24 and 25 adjacent their lower ends.

The mask 37 comprises metal frames 42 and 43 having spacing members 44 held therebetween at opposite sides to provide a central passage 45 for the sheet material. The side and end members of the frames 42 and 43 may be of any desired widths to provide proper margin widths on the finished sheets. The lower end of the mask is provided with aprons or light stops 46 which extend over the feed rollers and prevent the exposure of the lower margin portions of the sheets.

A knife 47 is slidably mounted upon the upper surface of the member 27 adjacent one side of the slot in the said member 27. Rack members 50 are attached to the knife and extend substantially transversely of the member 27 and in engagement with the upper surface thereof. Gear quadrants 51 are rigidly mounted on a shaft 52 which is rotatably mounted on the side members 24 and 25 in such positions as to engage the rack members 50. An operating lever 53 is rigidly attached to an end portion of the shaft 52 adjacent the side member 25 and extends beyond the outer side of the member 25. Spring members 54 are anchored on the member 27 and attached to the knife holding it normally in an inoperative or retarded position on one side of the slot in the member 27. A member 55 having a groove for the reception of the knife blade may be positioned on the side of the slot opposite the knife. The lever 53 may be operated to move the knife across the slot for the purpose of severing a section or area of sheet material extending therethrough and when the lever 53 is released the springs 54 immediately move the knife, rack, quadrant and lever back to their normal inoperative positions.

The side members 24 and 25 of the sheet holder are provided with substantially centrally disposed trunnions 56 and 57 respectively which project outwardly beyond said side members and are adapted to be seated in suitable bearings 60 and 61 on the side walls of the magazine. The outer end of the trunnion 57 has a spiral gear 62 rigidly mounted thereon for engagement with a similar gear 63 splined for sliding movement on a shaft 64 which is journaled in a support 65 mounted on a side wall of the magazine for movement therewith. An end portion of the shaft 64 is journaled in a support 66 mounted on the sleeve 15 and has a beveled gear 67 rigidly mounted thereon for engagement with a beveled gear 70 rigidly mounted on a vertical shaft 71 which is journaled in support 66 and a second support 72 mounted on the panel 10. A beveled gear 73 is rigidly mounted on the lower end portion of the shaft 71 for engagement with a beveled gear 74 which is rigidly mounted on a shaft 75 which is journaled in the panel 10 and a bracket 76 extending forwardly of the panel 10. A handwheel 77 is rigidly mounted on the outer end of the shaft 75 for rotating the sheet holder through the gear and shaft means just described.

A sleeve member having ratchet wheels 80 and 81 rigidly mounted thereon adjacent the ends thereof and a sprocket wheel 82 rigidly mounted thereon intermediate said ratchet wheels is rotatably mounted on the trunnion 57 and bearing 61. A ratchet pawl 83 is pivotally mounted on the side member 25 in such a position that an end thereof may be held in yielding contact with ratchet wheel 80 by means of a spring 84 which is anchored on the member 25. A second ratchet pawl 85 is pivotally mounted on a side wall of the magazine in such a position that an end may be held in yielding contact with the ratchet wheel 81 by means of a spring 86 which is anchored on the side wall of the magazine. A roller 87 is mounted on the ratchet pawl 85 intermediate its pivot and the contact end thereof and projects into the path of travel of a cam member 90 adjustably mounted on the spiral gear 62 by means of a clamp screw 91 which operates in an arcuate slot 92 in the gear wheel. When the cam member 90 and the roller 87 are in contact the ratchet pawl 85 and the ratchet wheel 81 are held out of engagement. A sprocket chain 93 extends between and operatively connects the sprocket wheel 82 mounted on the trunnion 57 and the sprocket wheel 38 mounted on the feed roll 32. A boss or lug 94 forming a stop member for the lever 53 is mounted on the inner face of a wall of the magazine in the path of travel of the lever 53 during the rotating of the holder. The position of the member 94 is such that it makes contact with the lever 53 after the feeding operation has been completed and that the cutting operation instituted by such contact is completed when the holder is in its normal vertical position.

Photographic paper or other sheet material is mounted on a spool 95 supported for rotation about a horizontal axis within the magazine in any suitable manner. The axes of rotation of the spool and the sheet holder are preferably parallel. When the paper or other sheet material is led from the top of the roll the axis of the roll is preferably below the axis of rotation of the sheet holder and consequently below the axis of the cone of projection in order to provide a substantially constant length of paper between the roll and the holder when the holder is in both of its exposing positions. The magazine is provided with a door 96 through which the roll may be inserted in and removed from the magazine.

When the apparatus is installed for use the panel forms part of the wall of a dark room and the apparatus is so positioned that the optical system, subject holder, and control mechanism are located on the outside of the room, and the magazine, sheet receiving chamber and associated mechanism are within the dark room.

In the operation of the device a spool 95 containing a roll of photographic paper or other sheet material sensitized on both sides is inserted in the magazine in such a manner that when a portion of the paper extends between the roll and the sheet holder its point or line of contact with the roll is near the top of the roll and substantially in line with the axis of rotation of the sheet holder and the axis of the cone of projection. Such an arrangement permits the maintenance of a uniform length of material between the roll and the holder for both exposing positions and makes the provision of means for reversing the roll to take up slack material and prevent buckling unnecessary. The roll holder 70 may be provided with means for tensioning the paper between the roll and the sheet holder, but such means are not necessary as the paper is tensioned and held properly in the focal plane entirely within the sheet holder.

Figure 2:
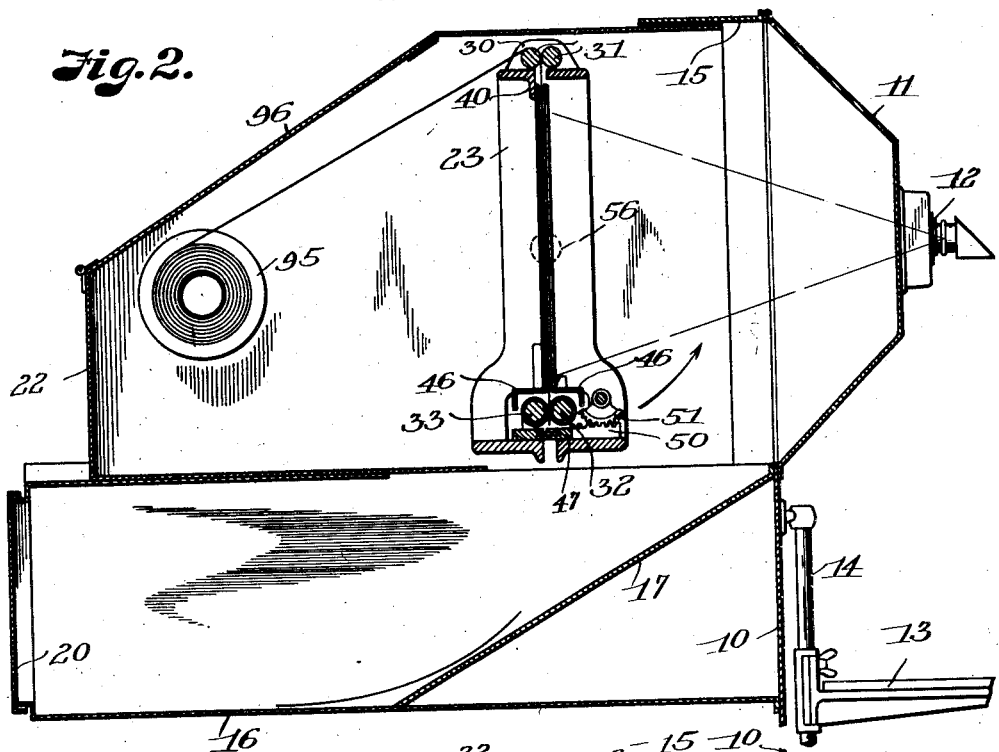
Figure 2 is a vertical longitudinal section through the camera, showing the parts in their normal positions for exposure of the first side of the photographic sheet.

When the roll has been positioned within the magazine, the free end of the sheet material is drawn between the rolls 31 through the space 45 in the mask and between the feed rolls 32 and 33. The arrangement of the various parts is then substantially as shown in Figure 2. It will be noted that the lever 53 is in contact with the stop member 94 and the knife 47 extends across the slot in the member 27 and the end of the sheet material is positioned immediately above the knife. After the sheet material has been properly inserted and a sheet or section of the material is ready for exposure in the sheet holder, a subject may be placed on the subject holder 13 and focused by raising or lowering the subject holder and by moving the magazine relatively to the lens according to a scale 97 on the side of the chamber 16. The first exposure is then made with the holder in the position shown in Figure 2. After the first exposure the handwheel 77 is revolved in such a manner as to turn the holder in the direction of the arrow shown in Figure 2 through 180° to the position shown in Figure 3, after which the second exposure may be made. During the above described rotation of the holder the ratchet pawl 83 is in engagement with a tooth of the ratchet wheel 80 and causes the ratchet wheels 80 and 81 and the sprocket wheel 82 to rotate on the bearing 61 with the sheet holder and the ratchet pawl 85 is lowered from the cam 90 and rides freely over the teeth of the ratchet wheel 81. Since the sprocket wheel 38 is mounted on the holder it also moves with the holder and there is no relative movement between the sprocket wheels 38 and 82 and consequently no rotation of the feed rollers. The lever 53 moves out of contact with the stop member 94 and the knife 47 is drawn back to an inoperative position by the springs 54.

Figure 3:
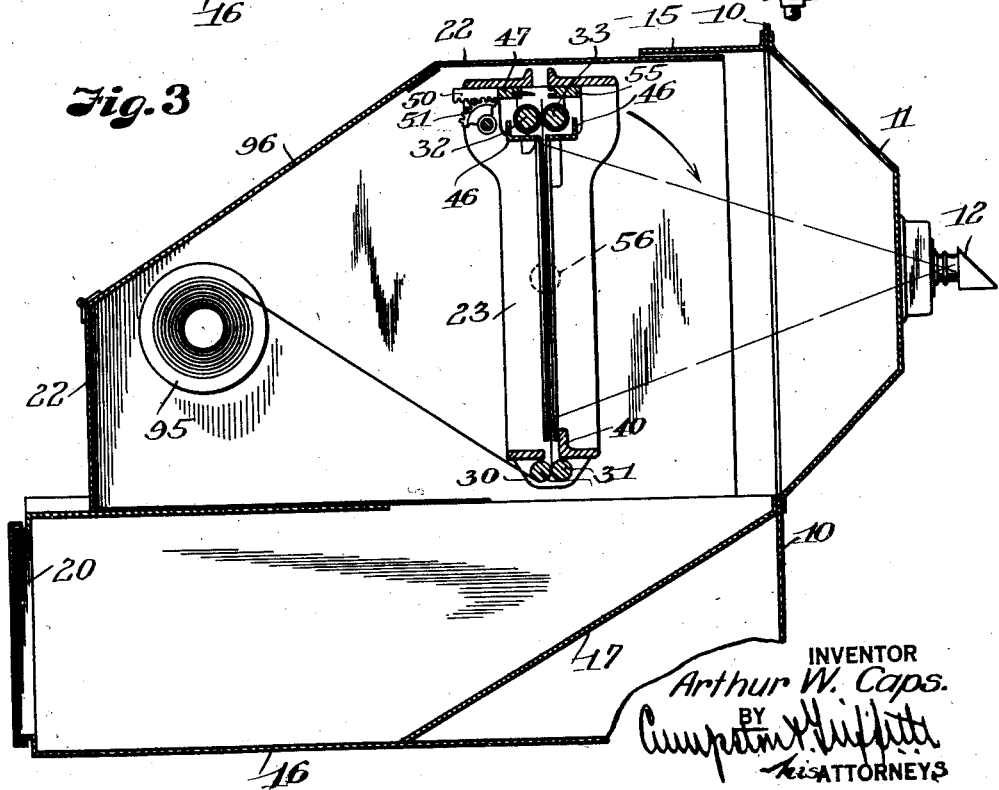
Figure 3 is a similar view showing the parts in position for exposing the opposite side of the sheet.
Figures 4, 5:
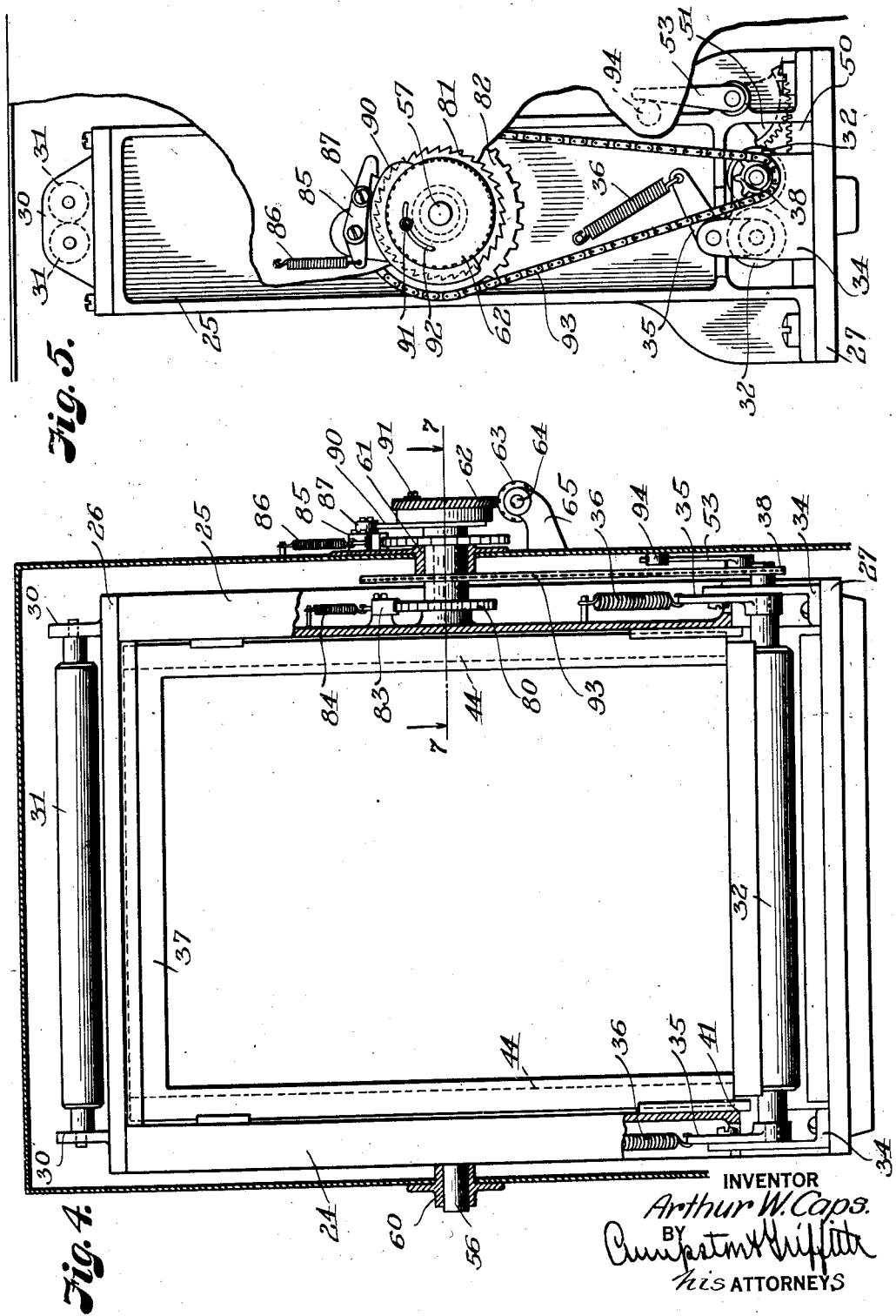
Figure 4 is a transverse section through the camera taken on line 4—4 of Figure 1.
Figure 5 is an end view of the paper holder and feeding mechanism, portion of the casing being shown to illustrate the mounting of certain parts thereon.
Figure 6:
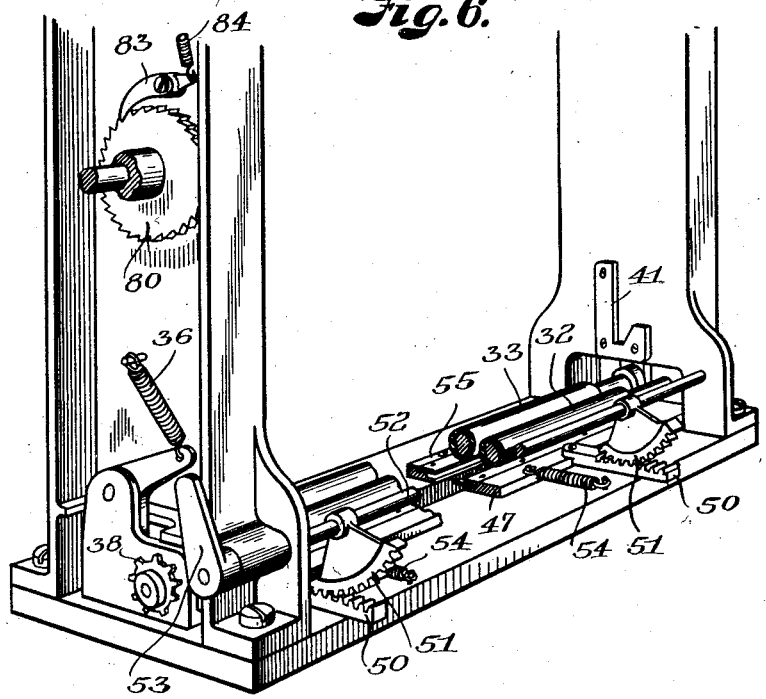
Figure 6 is a perspective view of the lower portion of the paper holder, certain parts being removed and others being shown in section for better illustration.
Figure 7:
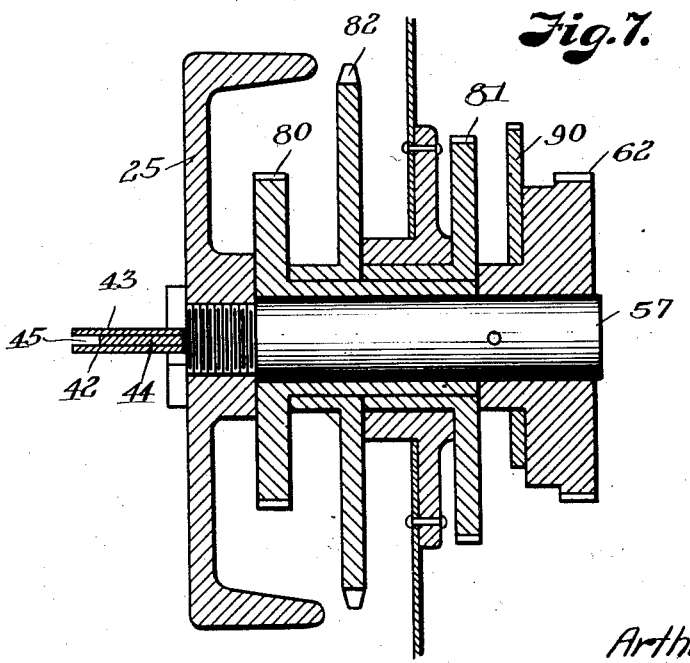
Figure 7 is a sectional view taken on line 7—7 of Figure 4.

After the second exposure has been made the handwheel 77 is revolved in the reverse direction and the holder is rotated in the direction indicated by the arrow in Figure 3 through 180° to the original position shown in Figure 2. During the rotation of the holder to return it to its original position, the ratchet pawl 85 which is mounted on the stationary magazine engages a tooth of the ratchet wheel 81 and holds the ratchet wheels 80 and 81 and the sprocket wheel 82 against rotation, meanwhile the ratchet pawl 83 rides freely over the teeth of the ratchet wheel 80.

Since the sprocket wheel 38 moves with the holder and the sprocket wheel 82 is held against rotation there is relative movement between the said sprocket wheels and a resulting rotation of the feed rollers to feed the paper or sheet material downwardly. Feeding action takes place as long as the ratchet pawl 85 engages a tooth of the ratchet wheel 81, but when the cam 90 engages the roller 87 the ratchet pawl 85 and ratchet wheel 81 are disengaged permitting the sprocket wheel to rotate with the holder and stopping the feeding action. As the holder in returning approaches its original position, the lever 53 engages the stop member 94 moving the knife to sever that portion of the sheet material which has been projected below the holder from the strip. The severed portion or sheet drops downwardly into the chamber 16 and is shunted in the direction of the door 20 by the inclined partition 17.

From the foregoing it will be seen that there is herein provided an apparatus which embodies the features of this invention and achieves the objects thereof. Photographic apparatus is provided which is efficient and dependable in operation, which may be readily included in a dark room structure as an integral part thereof, and by means of which the sheet holder may be operated entirely independently of the roll carrier; sections of the sensitized sheet material of desired lengths may be efficiently delivered to the sheet holder; and the exposed portions of the sheet material may be efficiently severed from the strip and delivered to a sheet receiving chamber.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim:

1. In apparatus of the class described, a stationary support comprising a wall having an aperture therein, projecting means mounted on said wall adjacent said aperture and extending forwardly of said wall, a sleeve mounted on said wall and extending rearwardly thereof, and a sensitized sheet carrying chamber slidably mounted on said sleeve in telescoping relation thereto.

2. In apparatus of the class described, a support comprising a sheet receiving chamber provided with an aperture in its upper wall, a magazine slidably mounted on said support and having an aperture in its bottom wall adapted to register with the first mentioned aperture, a sensitized sheet holder pivotally mounted in said magazine adjacent the aperture in said chamber and means for discharging a sheet from said sheet holder downwardly into said sheet receiving chamber.

3. In apparatus of the class described, an exposure chamber, means for rotatably supporting a roll of sensitized sheet material within said chamber, and a sheet holder pivotally mounted within said chamber independently of and in spaced relation to said roll carrying means and arranged to hold an unwound portion of said roll of sensitized sheet material.

4. In apparatus of the class described, an exposure chamber, a spool for carrying sensitized sheet material rotatably mounted within said chamber, and a sheet holder rotatably mounted within said chamber independently of and in spaced relation to said spool and arranged to hold a portion of said sensitized sheet material.

5. In apparatus of the class described, an exposure chamber, a spool for carrying sensitized sheet material rotatably mounted within said chamber and a sheet holder mounted within said chamber for rotation independently of said spool and about an axis substantially parallel to the axis of rotation of said spool and arranged to hold a portion of said sensitized sheet material.

6. In apparatus of the class described, an exposure chamber having oppositely disposed side walls, means for rotatably supporting a roll of sensitized sheet material mounted on said side walls, and a sheet holder pivotally mounted on said side walls independently of said roll supporting means.

7. In apparatus of the class described, an exposure chamber, a spool for carrying sensitized paper mounted for rotation about a horizontal axis within said chamber, and a sheet holder mounted for independent rotation about a second horizontal axis within said chamber.

8. In apparatus of the class described, a magazine having object-projecting means associated therewith, means for rotatably supporting a roll of sensitized sheet material within said magazine, a pivotally mounted sheet holder adapted to receive the sheet material from said roll and support successive portions thereof in the focal plane of the projecting means, and means for reversibly rotating said sheet holder through an angle of 180°; the axis of said roll supporting means being spaced from the axis of rotation of said sheet holder and lying in a plane spaced from a parallel plane containing the axis of the cone of projection.

9. In apparatus of the class described, a magazine having object-projecting means associated therewith, means for supporting a roll of sensitized sheet material for rotation about a horizontal axis within said magazine, a sheet holder mounted for rotation independent of said roll and about a horizontal axis within said magazine and adapted to receive the sheet material from said roll and support successive portions thereof in the focal plane of the projecting means, and means for reversibly rotating said sheet holder through an angle of 180°; the axis of said roll supporting means being spaced from the axis of rotation of said sheet holder and lying in a plane spaced from a parallel plane containing the axis of the cone of projection.

10. In apparatus of the class described, a magazine having object-projecting means associated therewith, means for rotatably supporting a roll of sensitized sheet material within said magazine, a sheet holder mounted for rotation independent of said roll and about an axis parallel to the axis of said roll supporting means and adapted to receive the sheet material from a roll mounted on said supporting means, and means for rotating said sheet holder for alternately positioning opposite sides of sheet material carried thereby in the focal plane of the projecting means.

11. In apparatus of the class described, a magazine having object-projecting means associated therewith, a sheet holder mounted for rotation about a horizontal axis within said magazine and adapted to receive a section of sensitized sheet material, means for reversibly rotating said sheet holder through an angle of 180°, and means operable during said rotation for feeding a section of sheet material to said holder.

12. In apparatus of the class described, a magazine having object-projecting means associated therewith, means for rotatably supporting a roll of sensitized sheet material within said magazine, a sheet holder mounted for rotation independent of said roll and about an axis parallel to the axis of said roll supporting means and adapted to receive the sheet material from a roll mounted on said supporting means, means for rotating said sheet holder for alternately positioning opposite sides of sheet material carried thereby in the focal plane of the projecting means, and means for feeding the sheet material to said holder.

13. In apparatus of the class described, a magazine having object-projecting means associated therewith, means for rotatably supporting a roll of sensitized sheet material within said magazine, a sheet holder mounted for rotation independent of said roll and about an axis parallel to the axis of said roll supporting means and adapted to receive the sheet material from a roll mounted on said supporting means, means for rotating said sheet holder for alternately positioning opposite sides of sheet material carried thereby in the focal plane of the projecting means, and means for feeding the sheet material to said holder automatically when the holder is rotated.

14. In apparatus of the class described, a magazine having object-projecting means associated therewith, means for rotatably supporting a roll of sensitized sheet material within said magazine, a sheet holder mounted for rotation independent of said roll and about an axis parallel to the axis of said roll supporting means and adapted to receive the sheet material from a roll mounted on said supporting means, means for feeding the sheet material to said holder, and means for dividing said sheet material into sheets.

15. In apparatus of the class described, a magazine having object-projecting means associated therewith, means for rotatably supporting a roll of sensitized sheet material within said magazine, a sheet holder mounted for rotation independent of said roll and about an axis parallel to the axis of said roll supporting means and adapted to receive the sheet material from a roll mounted on said supporting means, means for feeding the sheet material to said holder, and means for cutting said material into sheets.

16. In apparatus of the class described, a magazine having object-projecting means associated therewith, a sheet holder rotatably mounted within said magazine, means for feeding sensitized sheet material to said sheet holder, means for rotating said sheet holder to expose both sides of a section of sheet material carried thereby in the focal plane of the projecting means, means for actuating said feeding means automatically when the holder is rotated, and means for severing the exposed sections of said sheet material.

17. In apparatus of the class described, a magazine having object-projecting means associated therewith, means for rotatably supporting a roll of sensitized sheet material within said magazine, a sheet holder mounted for rotation about an axis parallel to the axis of said roll supporting means and adapted to receive the sheet material from a roll mounted on said supporting means, means for rotating said sheet holder for alternately positioning opposite sides of sheet material carried thereby in the focal plane of the projecting means, means for feeding the sheet material to said holder automatically when the holder is rotated, and means for cutting said material into sheets.

18. In apparatus of the class described, a magazine having object-projecting means associated therewith, a sheet holder pivotally mounted within said magazine and adapted to receive a strip of sensitized sheet material, means for reversibly rotating said holder through an angle of 180°, means for feeding a strip of sheet material to said holder by the act of rotating the holder, means for cutting said strip into sheets, and means for regulating the length of said sheets.

19. In apparatus of the class described, a magazine having object-projecting means associated therewith, means for rotatably supporting a roll of sensitized sheet material within said magazine, a sheet holder mounted for rotation about an axis parallel to the axis of said roll supporting means and adapted to receive the sheet material from a roll mounted on said supporting means, means for rotating said sheet holder for alternately positioning opposite sides of sheet material carried thereby in the focal plane of the projecting means, means operated by the rotation of the holder for feeding the sheet material to said holder, means for cutting the material into sheets, and means for varying the length of the sheets fed by a predetermined rotation of the holder.

20. In apparatus of the class described, a magazine having object-projecting means associated therewith, means for rotatably supporting a roll of sensitized sheet material within said magazine, a sheet holder mounted for rotation about an axis parallel to the axis of said roll supporting means and adapted to receive the sheet material from a roll mounted on said supporting means, means for rotating said sheet holder for alternately positioning opposite sides of sheet material carried thereby in the focal plane of the projecting means, means for feeding the sheet material to said holder automatically when the holder is rotated, means for cutting the material into sheets, and means for adjusting the automatic feeding means to vary the length of the sheets.

21. In apparatus of the class described, an exposure chamber, a sheet holder mounted for rotation within said chamber, sheet removing means mounted on said sheet holder, means for rotating said sheet holder and means for actuating said sheet removing means by the rotation of said holder.

22. In apparatus of the class described, an exposure chamber, a sheet holder mounted for rotation about a horizontal axis within said chamber, sheet removing means mounted on said sheet holder, means for rotating said sheet holder, and means for actuating said sheet removing means from said rotating means.

23. In apparatus of the class described, a magazine having object-projecting means associated therewith, a sheet holder rotatably mounted within said magazine, means for feeding sheet material to said holder mounted on said holder, means for rotating said holder to expose both sides of a section of sheet material carried thereby, and means for automatically actuating said feeding means when the holder is rotated.

24. In apparatus of the class described, a magazine having object projecting means associated therewith, a sheet holder rotatably mounted within said magazine, means for feeding sheet material to said holder mounted on said holder, means for rotating said holder to expose both sides of a section of sheet material carried thereby, means for automatically actuating said feeding means when the holder is rotated, and means for severing the exposed sections from said sheet material.

25. In apparatus of the class described, a magazine having object-projecting means associated therewith, a sheet holder rotatably mounted within said magazine, means for feeding sheet material to said holder mounted on said holder, means for rotating said holder to expose both sides of a section of sheet material carried thereby, means for automatically actuating said feeding means when the holder is rotated, and means mounted on said holder for severing the exposed sections of said sheet material.

26. In apparatus of the class described, a magazine having object projecting means associated therewith, a sheet holder rotatably mounted within said magazine, means for feeding a strip of sheet material to said holder mounted on said holder, means for rotating said holder to expose both sides of a section of sheet material carried thereby, means for automatically actuating said feeding means when the holder is rotated, means for severing the exposed sections from said sheet material, and means for regulating the length of the severed sections.

27. In apparatus of the class described, the combination with a rotatably mounted sheet holder, of means for rotating said holder and means for automatically feeding a section of sheet material to said holder when the holder is rotated.

28. In apparatus of the class described, the combination with a rotatably mounted sheet holder, of means for rotating said holder, means for automatically feeding sheet material to said holder when the holder is rotated, and means for regulating said feeding means to vary the length of the section of material fed to the holder during a rotation of predetermined extent.

29. In apparatus of the class described, the combination with a magazine having roll supporting means and object projecting means associated therewith, of a sheet holder rotatably mounted within said magazine intermediate the roll supporting means and the object projecting means.

30. In apparatus of the class described, the combination with a rotatably mounted sheet holder having feed rollers rotatably mounted thereon, of means for periodically rotating said feed rollers by rotation of the holder.

31. In apparatus of the class described, the combination with a rotatably mounted sheet holder having feed rollers mounted thereon, of means for rotating said sheet holder and means for automatically rotating said rollers when the sheet holder is rotated.

32. In apparatus of the class described, the combination with a rotatably mounted sheet holder having feed rollers mounted thereon for rotation about axes parallel to the axis of rotation of said holder, of means for periodically rotating said feed rollers.

33. In apparatus of the class described, the combination with a rotatably mounted sheet holder having a feed roller mounted thereon for rotation about an axis parallel to the axis of rotation of said holder, of means for rotating said holder and means for automatically rotating said feed roller when the holder is rotated.

34. In apparatus of the class described, the combination with a rotatably mounted sheet holder having a feed roller mounted thereon for rotation about an axis parallel to the axis of rotation of said holder, of means for rotating said holder, means for automatically rotating said feed roller when the holder is rotated, and means for varying the effect of the rotation of the holder upon said roller rotating means.

35. In apparatus of the class described, a sheet holder mounted for reversible rotation, a feed roller mounted on said sheet holder for rotation about an axis parallel to the axis of rotation of said holder and having a sprocket wheel rigidly mounted thereon adjacent one end, a second sprocket wheel rotatably mounted adjacent said holder and connected to the sprocket wheel carried by said roller by means of a sprocket chain, means for rotating said second sprocket wheel with said holder, and means for locking said second sprocket wheel against rotation when the holder is rotated to cause relative movement of the two sprocket wheels and thereby rotate said feed roller.

36. In apparatus of the class described, the combination with a sheet holder mounted for reversible rotation, of means for rotating said sheet holder and sheet severing means operable automatically by the last part of the return movement of said sheet holder.

37. In apparatus of the class described, the combination with a sheet holder mounted for reversible rotation of sheet cutting means extending substantially parallel to the axis of rotation of said holder and automatically operable upon the completion of the return movement of said sheet holder.

38. In apparatus of the class described, the combination with a sheet holder mounted for reversible rotation and having sheet cutting means mounted thereon and extending substantially parallel to the axis of rotation thereof, of means for rotating said sheet holder and means for automatically operating said cutting means upon the completion of the return movement of said holder.

39. In apparatus of the class described, a sheet holder having trunnions projecting from opposite sides thereof, a support provided with bearings for the reception of said trunnions, a sleeve member rotatably mounted on one of said trunnions and having a sprocket wheel rigidly mounted thereon, a feed roller mounted on said sheet holder in spaced relation to said trunnions and having a sprocket wheel mounted thereon, a sprocket chain connecting said sprocket wheels, means for rotating said holder, means for causing said sleeve to rotate with said holder, and means for locking said sleeve against rotation to cause relative movement of the two sprocket wheels and rotation of the feed roller.

40. In apparatus of the class described, a sheet holder having trunnions projecting from opposite sides thereof adjacent the center, a support provided with bearings for the reception of said trunnions, a sleeve member rotatably mounted on one of said trunnions and having ratchet wheels rigidly mounted thereon adjacent the ends thereof and a sprocket wheel rigidly mounted thereon intermediate said ratchet wheels, a feed roller mounted on said sheet holder in spaced relation to said trunnions and having a sprocket wheel rigidly mounted thereon, a sprocket chain connecting said sprocket wheels, means for reversibly rotating said sheet holder through an angle of substantially 180°, a ratchet pawl mounted on said holder in such a manner as to engage a tooth of one of said ratchet wheels and cause said sleeve member to rotate with said holder during the rotation of the holder in one direction, and a second ratchet pawl mounted on said support in such a manner as to engage a tooth of the second ratchet wheel and prevent rotation of the sleeve member during movement of the holder in the opposite direction.

41. In apparatus of the class described, a sheet holder having trunnions projecting from opposite sides thereof adjacent the center, a support provided with bearings for the reception of said trunnions, a sleeve member rotatably mounted on one of said trunnions and having ratchet wheels rigidly mounted thereon adjacent the ends thereof and a sprocket wheel rigidly mounted thereon intermediate said ratchet wheels, a feed roller mounted on said sheet holder in spaced relation to said trunnions and having a sprocket wheel rigidly mounted thereon, a sprocket chain connecting said sprocket wheels, means for reversibly rotating said sheet holder through an angle of substantially 180°, a ratchet pawl mounted on said holder in such a manner as to engage a tooth of one of said ratchet wheels and cause said sleeve member to rotate with said holder during the rotation of the holder in one direction, a second ratchet pawl mounted on said support in such a manner as to engage a tooth of the second ratchet wheel and prevent rotation of the sleeve member during movement of the holder in the opposite direction, and adjustable cam means for regulating the action of said second ratchet pawl.

42. In apparatus of the class described, a sheet holder having trunnions projecting from opposite sides thereof adjacent the center, a support provided with bearings for the reception of said trunnions, a sleeve member rotatably mounted on one of said trunnions and having ratchet wheels rigidly mounted thereon adjacent the ends thereof and a sprocket wheel rigidly mounted thereon intermediate said ratchet wheels, a feed roller mounted on said sheet holder in spaced relation to said trunnions and having a sprocket wheel rigidly mounted thereon, a sprocket chain connecting said sprocket wheels, means operatively connected with one of said trunnions, for reversibly rotating said sheet holder through an angle of substantially 180°, a ratchet pawl mounted on said holder in such a manner as to engage a tooth of one of said ratchet wheels and cause said sleeve member to rotate with said holder during the rotation of the holder in one direction, and a second ratchet pawl mounted on said support in such a manner as to engage a tooth of the second ratchet wheel and prevent rotation of the sleeve member during movement of the holder in the opposite direction.

43. In apparatus of the class described, an exposure chamber having parallel side walls, a sheet holder having trunnions projecting from opposite sides thereof adjacent the center mounted within said chamber and supported for rotation on said side walls, one of said trunnions projecting through and extending beyond one of said side walls, a sleeve member rotatably mounted on one of said trunnions and having ratchet wheels rigidly mounted thereon adjacent the ends thereof and a sprocket wheel rigidly mounted thereon intermediate said ratchet wheels, a feed roller mounted on said sheet holder in spaced relation to said trunnions and having a sprocket wheel rigidly mounted thereon, a sprocket chain connecting said sprocket wheels, a worm wheel rigidly mounted on said projecting trunnion, a handwheel operatively connected with said worm wheel for reversibly rotating said sheet holder through an angle of substantially 180°, a ratchet pawl mounted on said holder in such a manner as to engage a tooth of one of said ratchet wheels and cause said sleeve member to rotate with said holder during the rotation of the holder in one direction, and a second ratchet pawl mounted on a chamber wall in such a manner as to engage a tooth of the second ratchet wheel and prevent rotation of the sleeve member during movement of the holder in the opposite direction.

44. In apparatus of the class described, means for supporting a sheet holder, a sheet holder mounted for reversible rotation on said supporting means, cutting means mounted on said sheet holder in spaced relation to the axis of rotation of said holder and having an operating lever projecting beyond said holder, means for rotating said holder and said cutting means carried thereby, and a stop member extending into the path of travel of said operating lever and engageable therewith to operate said cutting means when the holder is rotated.

45. In apparatus of the class described, a frame, a sheet holder movable relative thereto, a sheet cutter slidably mounted on said sheet holder, a rack member mounted on said cutter, a shaft rotatably mounted on said holder and having gear means rigidly mounted thereon for engagement with said rack member, an operating lever rigidly mounted on said rotatable shaft, and means operated by the relative movement of said frame and sheet holder for moving said operating lever to operate said cutter.

46. In apparatus of the class described, a sheet holder mounted for reversible rotation, sheet cutting means mounted on said holder in spaced relation to the axis of rotation of said holder, whereby when the holder is rotated the cutting means moves through an arc of a circle, spring means for holding said cutting means normally in an inoperative position and for returning said cutting means to an inoperative position after a cutting operation, a lever operatively connected with said cutting means, means for rotating said holder, and a stop member extending into the path of travel of said lever and engageable therewith to operate said cutting means when the holder is rotated.

47. In apparatus of the class described, a frame, a sheet holder rotatably mounted relative to said frame, a sheet cutter movably mounted on said holder, a rack member mounted on said cutter, a shaft rotatably mounted on said holder and having gear means rigidly mounted thereon for engagement with said rack member, spring means for normally holding said cutter in an inoperative position, a lever rigidly mounted on said rotatable shaft for operating said cutting means, and means for operating said lever by rotation of said holder relative to said frame.

ARTHUR W. CAPS.